No. 706,678. Patented Aug. 12, 1902.
E. H. MOORMAN, Dec'd.
S. M. MOORMAN, Administratrix.
DUPLEX HOOK FOR HITCHING STRAPS, &c.
(Application filed Jan. 21, 1901.)
(No Model.)
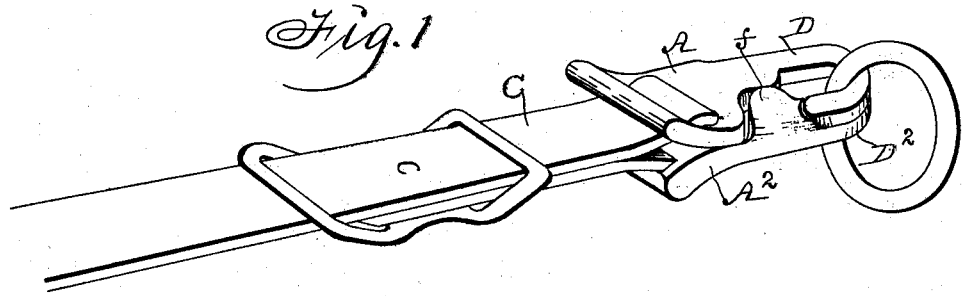
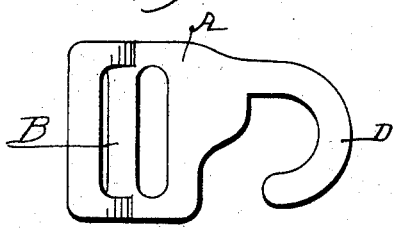 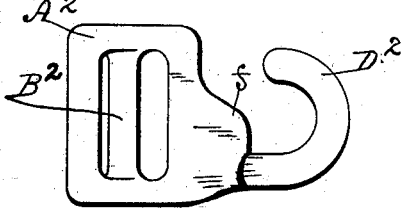
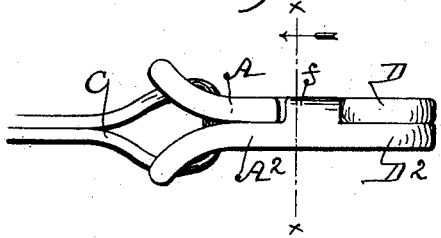 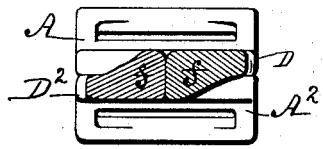
Witnesses:
R. G. Orwig
F. C. Stuart
Inventor: Eli H. Moorman,
By Thomas G. Orwig, Attorney.
THE NORRIS PETERS CO., PHOTO-LITHO., WASHINGTON, D. C.

UNITED STATES PATENT OFFICE.

ELI H. MOORMAN, OF WINTERSET, IOWA; SARAH M. MOORMAN ADMINISTRATRIX OF SAID ELI H. MOORMAN, DECEASED.

DUPLEX HOOK FOR HITCHING-STRAPS, &c.

SPECIFICATION forming part of Letters Patent No. 706,678, dated August 12, 1902.

Application filed January 21, 1901. Serial No. 44,000. (No model.)

*To all whom it may concern:*

Be it known that I, ELI H. MOORMAN, a citizen of the United States, residing at Winterset, in the county of Madison and State of Iowa, have invented a new and useful Duplex Hook for Hitching-Straps, &c., of which the following is a specification.

My object is to provide a simple and durable coupling device for detachably connecting a hitching-strap to a bridle-ring and for like purposes in connecting parts of harness. Heretofore snap-hooks having spring-actuated tongues have been used for such purpose; but springs and tongues attached to a hook often become inoperative and cause runaways and accidents.

My invention consists in the construction, arrangement, and combination of two mating hooks with a flexible strap, as hereinafter set forth, pointed out in my claim, and illustrated in the accompanying drawings, in which—

Figure 1 is a perspective view showing my invention applied to the end of a leather hitching-strap, as required for practical use. Figs. 2 and 3 show the forms of the two mating right and left hooks adapted to be jointly connected with the end portion of a strap to couple to a ring, as shown in Fig. 1. Fig. 4 is an edge view showing the two mating hooks overlying each other, as occurs when they are in their normal positions. Fig. 5 is a sectional view on the line $x\ x$ of Fig. 4.

The letters A and $A^2$ designate the body portions of the two mating hooks curved in opposite directions at their rear end and provided with parallel transverse slots and cross-bars B and $B^2$ between the slots, adapted to be jointly engaged by a leather strap C, extended through the slots, and the overlying parts of the straps then fixed together by riveting or sewing, or detachably connected by means of a buckle, as shown in Fig. 1. Each body portion A and $A^2$ has an integral hook D $D^2$ extending forward in the plane of its front part and curved laterally, but in opposite directions relative to each other. Each body portion also has an integral projection or swell $f$ at the base of the hook adapting them to be in contact at their inner edges when the hooks are in overlying position, as shown in Fig. 1 and as required to prevent any lateral movements of the two mating parts when in engagement with a ring. Each body portion A and $A^2$ has a loop at its rear that curves outward in such a manner that when a strap is connected with the two cross-bars B and $B^2$ the loops will stand apart, so they can be pressed together for separating the hooks, as required, for connecting and disconnecting them with a ring. By connecting the two mating parts, having hooks projecting therefrom, by means of a leather strap, as shown in Figs. 1 and 4, a duplex hook is produced that is normally retained in a closed position by the resiliency of the flexible strap in such a manner that when the hooks jointly engage a ring the strap will be securely connected with the ring and a bridle or other parts of a harness to which the ring is attached, and force applied to the ring will aid in retaining the strap and ring connected. To disconnect the duplex hook from the ring the rear curved ends of the body portions of the mating parts A and $A^2$ must be pressed toward each other in order to spread apart the hooks B and $B^2$, as indicated by dotted lines in Fig. 4.

Having described the construction, application, and operation of my invention, its practical utility will be readily understood by persons familiar with the art to which it pertains, and

What I claim as new, and desire to secure by Letters Patent therefor, is—

A duplex hook for hitching-straps, consisting of two mating parts adapted to be adjustably connected with a strap, each part consisting of a body portion that has a hook at its front end, a cross-bar in rear of the hook and a loop curved outwardly at its rear end in combination with a leather strap, as shown and described to operate in the manner set forth for the purposes stated.

ELI H. MOORMAN.

Witnesses:
 G. H. GARRETT,
 JOHN W. WILLIAMS.